(12) United States Patent
Dibbur

(10) Patent No.: US 10,013,069 B2
(45) Date of Patent: Jul. 3, 2018

(54) METHODS AND APPARATUS TO DETECT VIBRATION INDUCING HAND GESTURES

(71) Applicant: Intel Corporation, Santa Clara, CA (US)

(72) Inventor: Viswanath Dibbur, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/264,117

(22) Filed: Sep. 13, 2016

(65) Prior Publication Data

US 2018/0074593 A1 Mar. 15, 2018

(51) Int. Cl.
*G06F 3/01* (2006.01)
*G06F 1/16* (2006.01)

(52) U.S. Cl.
CPC .............. *G06F 3/017* (2013.01); *G06F 3/014* (2013.01); *G06F 1/163* (2013.01)

(58) Field of Classification Search
None
See application file for complete search history.

(56) References Cited

U.S. PATENT DOCUMENTS

| | | |
|---|---|---|
| 9,104,271 B1 | 8/2015 | Adams et al. |
| 2002/0126026 A1 | 9/2002 | Lee et al. |
| 2004/0207542 A1* | 10/2004 | Chang ............... G06F 1/1626 341/20 |
| 2004/0217941 A1 | 11/2004 | Chen |
| 2010/0289740 A1* | 11/2010 | Kim .................. G04G 21/04 345/157 |
| 2011/0269544 A1 | 11/2011 | Daniel |
| 2016/0062320 A1 | 3/2016 | Chung |

OTHER PUBLICATIONS

Wikipedia, "Sound localization," http://en.wikipedia.org/wiki/Sound_localization, accessed Aug. 4, 2016, 9 pages.
International Searching Authority, "International Search Report and Written Opinion," issued in connection with International Patent Application No. PCT/US2017/042623, dated Oct. 24, 2017, 13 pages.

\* cited by examiner

*Primary Examiner* — Gustavo Polo
(74) *Attorney, Agent, or Firm* — Hanley, Flight & Zimmerman, LLC

(57) ABSTRACT

Methods and apparatus to detect vibration inducing hand movements are disclosed. An example apparatus includes a sensor to detect a vibration in a hand of a user wearing the apparatus. The example apparatus further includes a processor to analyze the vibration to identify a user selection of a virtual control associated with an input to an electronic device.

25 Claims, 7 Drawing Sheets

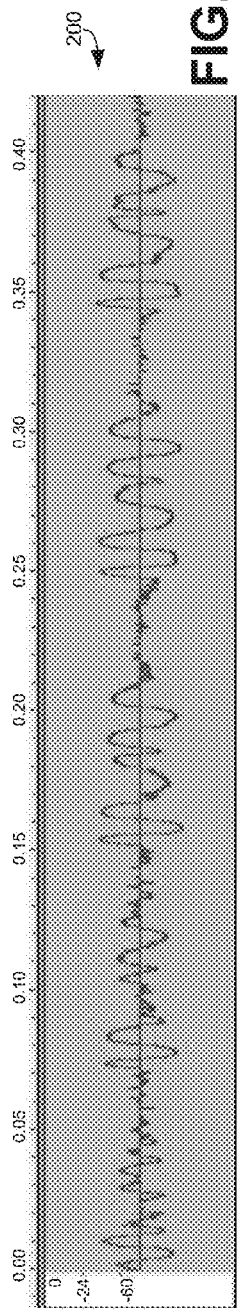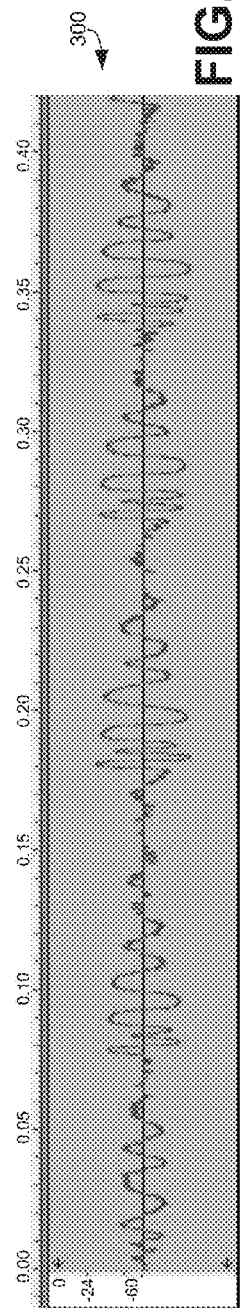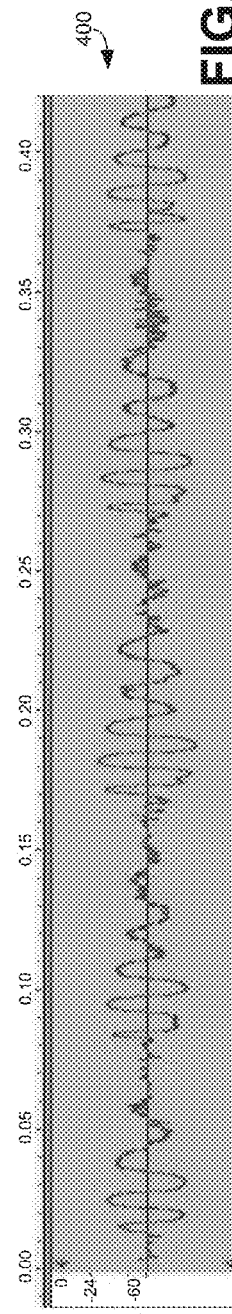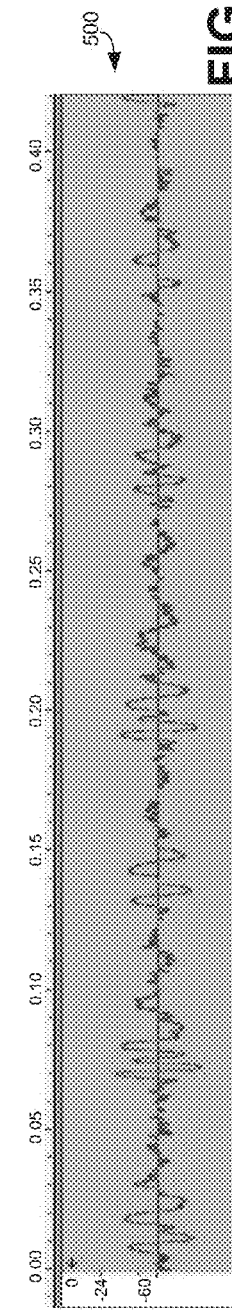

METHODS AND APPARATUS TO DETECT VIBRATION INDUCING HAND GESTURES

FIELD OF THE DISCLOSURE

This disclosure relates generally to human-machine interfaces, and, more particularly, to methods and apparatus to detect vibration inducing hand gestures.

BACKGROUND

Many electronic devices include human-machine interfaces that enable users to interact with such devices. For example, electronic devices often include keyboards, keypads, and/or other types of buttons to enable users to provide inputs to the electronic devices. As many portable electronic devices are becoming smaller, the amount of available space to include such input keys or buttons is becoming limited.

BRIEF DESCRIPTION OF THE DRAWINGS

FIGS. 2-5 are graphs illustrating example vibration patterns detected by the sensor of the example apparatus of FIG. 1.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

As electronic devices continue to get smaller, the amount of space available for keyboards, keypads, and/or other user input buttons is becoming more limited. Some solutions involve using image sensors to detect a user pressing buttons of a virtual keyboard projected onto a surface. However, such systems are relatively complex and still require a physical space and suitable surface onto which the virtual keyboard can be projected.

An example wearable apparatus constructed in accordance with the teachings disclosed herein enables a user to convert their fingers into an array of virtual buttons that may be associated with particular inputs to an electronic device. In particular, examples disclosed herein use one or more sensors to detect vibration inducing hand movements associated with tapping each finger. For example, each of the four fingers may correspond to a particular virtual button that is selected when the desired finger is tapped against the user's thumb. That is, the impact of a particular finger against the thumb may produce a shock wave of vibrations that travel through the hand to be detected by a sensor worn on the hand or forearm of the user. In some examples, vibrations generated from different hand movements or gestures (e.g. each different finger being tapped against the thumb) are identified and distinguished based on differences in the vibration patterns of the different hand movements or gestures.

In some examples, more than one vibration sensor is used to detect and distinguish different hand movements. In some examples, the sensors are spaced apart such that a vibration signal generated by an impact (e.g., from a thumb tap) at the tip of one finger will take longer to travel to a first sensor than to a second sensor. In some such examples, taps on different finger tips are identified based on the difference in time between the detection of the vibration at the first and second sensors.

Figure 1:
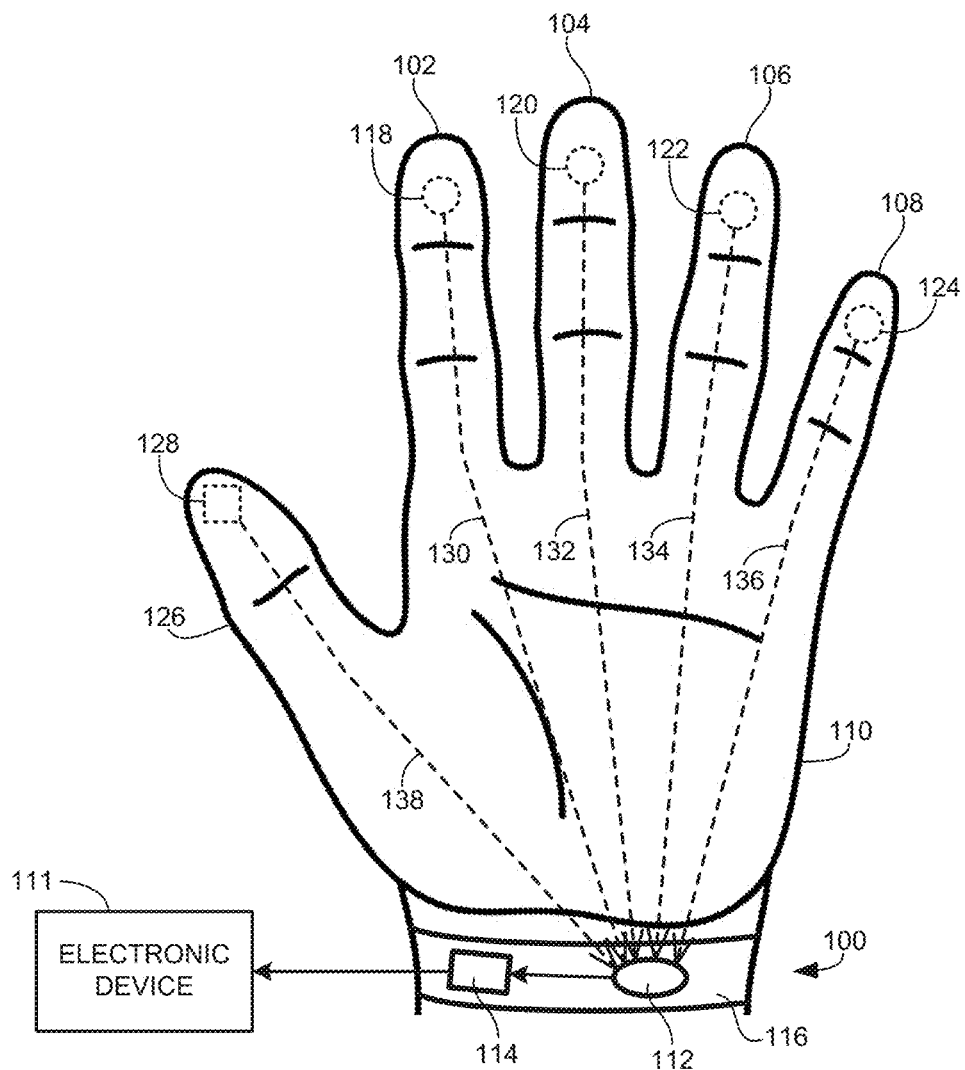
FIG. 1 illustrates an example wearable apparatus to convert a user's fingers into an array of virtual buttons.

Turning in detail to the drawings, FIG. 1 illustrates an example wearable apparatus 100 to convert the fingers 102, 104, 106, 108 of a user's hand 110 into an array of virtual buttons, or more generally, virtual controls, that may serve as inputs to any suitable electronic device 111 (e.g., a smartphone, a watch, a wearable healthcare device (e.g., a fitness monitor), a tablet, a portable gaming device, a laptop computer, a desktop computer, etc.). In the illustrated example, the apparatus 100 includes a sensor 112 and a processor 114 that are held in place using a band 116. The sensor 112 may be any suitable vibration sensor such as, for example, a microphone, or a piezoelectric sensor that detects vibrations and provides corresponding feedback to the processor 114 for subsequent analysis. In some examples, more than one sensor 112 may be used. The processor 114 may be any suitable processor (e.g., a digital signal processor, a microprocessor, etc.) to process and/or analyze vibration signals detected by the sensor 112.

In the illustrated example, the sensor 112 is held against the forearm or wrist associated with the hand 110 of the user to detect vibrations passing through the hand 110 of the user. While the sensor 112 is shown held against the front of a user's wrist, in other examples, the sensor 112 may be attached to the user at another suitable location that can detect vibrations passing through the hand 110 (e.g., on the back of the wrist, on the back of the hand, in the palm of the hand, etc.). Securing the sensor 112 to the user with the band 116 about the wrist of the user enables the identification of certain hand movements and/or gestures (based on detected vibrations as discussed more fully below) without any part of the apparatus 100 directly contacting any part of the hand 110 of the user. Thus, the user's hand is not limited in anyway but is entirely free to move.

While the band 116 is used in the illustrated example, other means for attaching the sensor 112 to the user may also be used. For example, the means for attaching the sensor 112 to the user may include a removable adhesive. In some examples, the adhesive may be applied on the underside of the sensor 112 (e.g., between the sensor 112 and the skin of the user). In other examples, the removable adhesive may on an adhesive strip that is placed over top of the sensor 112. In other examples, the means for attaching the sensor 112 to the user may include a glove, sleeve, or other article of clothing worn over the hand 110 and/or wrist that incorporates the sensor 112. In some examples, the means for attaching the sensor 112 to the user may be spaced apart from the hand (e.g., contacting the wrist or forearm of the user without contacting any part of the hand) to enable free movement of the hand without physical constraint. In some examples, the means for attaching the sensor 112 to the user may contact the palm and/or back of the hand 110 but not contact the fingers 102, 104, 106, 108 to leave them free to move without physical constraint. In other examples, the means for attaching the sensor 112 to the user may contact only a base portion of the fingers 102, 104, 106, 108 to leave at least an upper portion of the fingers free.

Additionally or alternatively, in some examples, the apparatus 100 is manufactured integrally with the electronic device 111. For example, the electronic device 111 may be a smart watch with the sensor 112 built into the watch band or the back face of the watch. In other examples, the apparatus 100 may be provided as an accessory to the electronic device 111 that communicates either wirelessly or through a wired connection to the electronic device 111.

In some examples, the processor 114 corresponds to a processor of the electronic device 111. That is, regardless of whether the apparatus 100 is integrally formed with, or manufactured apart from, the electronic device, the apparatus 100 may not include a dedicated processor (e.g., the processor 114). Rather, in some examples, the sensor 112 may communicate detected vibrations directly to a processor on the electronic device 111 that also serves as the processor for other functionalities of the electronic device 111.

In the illustrated example, the tip of the index finger 102 serves as a first virtual button or control 118, the tip of the middle finger 104 serves as a second virtual button or control 120, the tip of the ring finger 106 serves as a third virtual button or control 122, and the tip of the little finger 108 serves as a fourth virtual button or control 124. In the illustrated example, each of the virtual buttons 118, 120, 122, 124 may be selected by the tip of a thumb 126 corresponding to a virtual button selector 128. More particularly, if a user desires to select the first virtual button 118, the user taps the button selector 128 (e.g., the tip of the thumb 126) against the first virtual button 118 (e.g., the tip of the index finger 102). The impact of the thumb 126 against the index finger 102 generates a first vibration (represented by the dashed line 130) originating at the first virtual button 118 that travels down the index finger 102 and through the user's hand 110 where it may be detected by the sensor 112. Although the travel path of the first vibration 130 represented by the dashed line is shown terminating at the sensor 112, it should be appreciated that the first vibration 130 will spread throughout the hand 110 such that the first vibration 130 could be detected by the sensor 112 positioned in a different location (as in FIG. 6 discussed more fully below). Similar to the first vibration 130, tapping the button selector 128 against the second virtual button 120 generates a second vibration 132, tapping the button selector 128 against the third virtual button 122 generates a third vibration 134, and tapping the button selector 128 against the fourth virtual button 124 generates a fourth vibration 136.

Although the location of the virtual buttons 118, 120, 122, 124 and the button selector 128 are represented in FIG. 1, particular users may tap their fingers and thumb together at slightly different locations than what is shown. It is expected that any particular user will use substantially the same hand movement each time such that, the vibrations produced by such a hand movement will be relatively consistent. Thus, in some examples, the apparatus 100 is initially calibrated to the hand movements of a particular user by the user repeatedly performing each hand movement (e.g., selecting each virtual button 118, 120, 122, 124) until the processor 114 can adequately identify the hand movement associated with the selection of each virtual button 118, 120, 122, 124.

Regardless of which virtual button 118, 120, 122, 124 the button selector 128 is tapped against, the impact will also generate a separate vibration travel path 138 originating at the button selector 128 that travels down the thumb 126 until it is detected by the sensor 112. Thus, the combination of the vibration 138 down the thumb along with the vibration 130, 132, 134, 136 down the particular finger 102, 104, 106, 108 tapped together produce a unique vibration signal picked up by the sensor 112 that can be identified through processing by the processor 114.

In particular, FIGS. 2-5 are graphs 200, 300, 400, 500 illustrating example vibration patterns detected by the sensor 112 during testing of a working model of the example apparatus 100 of FIG. 1. The first graph 200 of FIG. 2 is representative of the vibration signal pattern corresponding to repeated tappings of the first virtual button 118. The second graph 300 of FIG. 3 is representative of the vibration signal pattern corresponding to repeated tappings of the second virtual button 120. The third graph 400 of FIG. 4 is representative of the vibration signal pattern corresponding to repeated tappings of the third virtual button 122. The fourth graph 500 of FIG. 5 is representative of the vibration signal pattern corresponding to repeated tappings of the fourth virtual button 124.

As can be seen from the graphs 200, 300, 400, 500 of FIGS. 2-5, the waveform corresponding to the vibration associated with the selection of each virtual button 118, 120, 122, 124 is relatively consistent between different taps indicating the repeatability of the waveform associated with each individual button selection (i.e., each tap). Further, the waveform corresponding to the selection of each virtual button 118, 120, 122, 124 is relatively distinct from the waveforms corresponding to the other virtual buttons 118, 120, 122, 124, thereby enabling reliable identification of each button selection distinguished from the others. Thus, in some examples, a user may make the hand motions associated with the selection of each virtual button one or more times during a calibration of the apparatus 100 to collect reference vibration signals that may be stored for subsequent use in identifying the hand movements. The processor 114 may use any suitable pattern detection technique or apply a cross correlation to identify the pattern associated with each virtual button 118, 120, 122, 124 based on a match with the stored reference vibration signals.

Once a particular vibration inducing hand movement and/or gesture (corresponding to a particular virtual button selection) is identified, the processor 114 may provide such information to the electronic device 111 to implement a particular functionality assigned to the detected hand movement. There are many different functionalities that could be associated with each virtual button 118, 120, 122, 124. For example, in connection with consuming media content via the electronic device 111, the virtual buttons 118, 120, 122, 124 may serve to control the volume up and down, to play or pause the media, to skip to a next media presentation, to change a radio channel or station, etc. In the context of telephone usage, the virtual buttons 118, 120, 122, 124 may enable a user to answer or reject an incoming call. Other functionalities may also be implemented that are specific to the application executed on the electronic device 111 to which the buttons are associated. For example, the virtual buttons 118, 120, 122, 124 may serve as controllers in a video game, as a keyboard or drums to compose music, and/or any other suitable function.

In some examples, the vibrations generated from a hand movement associated with the selection of a particular virtual button 118, 120, 122, 124 may be different from one person to another. For example, the waveform or profile of a vibration generated by a particular hand movement performed by two different people may be different as a result of differences in the size, shape, etc. of people's hands and/or the particular way they move and/or hold their hand when performing the particular hand movement. Accordingly, in some examples, the information provided to the electronic device 111 provided by the processor 114 may be indicative of the identity of the person making the hand movements. That is, in some examples, the vibration information collected by the sensor 112 and analyzed by the processor 114 may be used to uniquely identify the particular user of the electronic device 111 (e.g., if unique reference vibrations signals for each of multiple users have been previously obtained).

Figure 6:
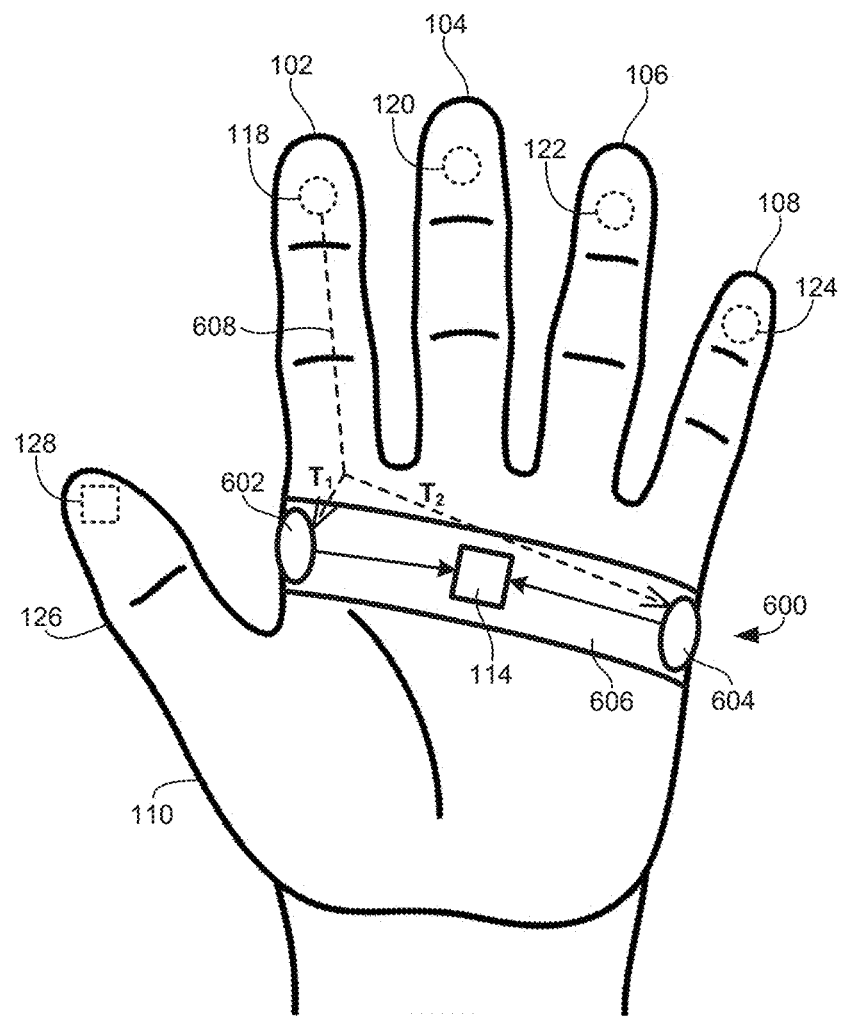
FIG. 6 illustrates another example wearable apparatus to convert a user's fingers into an array of virtual buttons.

FIG. 6 illustrates another example wearable apparatus 600 to convert a user's fingers 102, 104, 106, 108 into the virtual buttons 118, 120, 122, 124 as described above. However, unlike the example apparatus 100 of FIG. 1, the example apparatus 600 includes two sensors 602, 604 that are positioned on the palm of the hand 110 rather than on the wrist or at the base of the hand. The sensors 602, 604 may be similar or identical to the sensor 112 of FIG. 1. In the illustrated example of FIG. 6, the sensors 602, 604 are spaced apart such that the first sensor 602 is proximate a first edge of the hand 110 near the base of the index finger 102 and the second sensor 604 is proximate a second opposite edge of the hand 110 near the base of the little finger 108. In some examples, the sensors 602, 604 are held in place by a band 606 that may also carry a processor 114 to receive and process signals detected by the sensors 602, 604 in a similar manner as described above in connection with FIG. 1. Although the band 606 wraps around the palm of the hand, the apparatus 600 of FIG. 6 may detect taps on the virtual buttons 118, 120, 122, 124 at the tips of the fingers 102, 104, 106, 108 without any part of the apparatus 600 directly contacting any part of the fingers 102, 104, 106, 108.

In the illustrated example, each of the two sensors 602, 604 separately detects vibrations generated when the button selector 128 (i.e., the tip of the thumb 126) taps a particular virtual button 118, 120, 122, 124 (i.e., the tip of one of the fingers 102, 104, 106, 108). That is, as shown in the illustrated example, a vibration 608 originating from the first virtual button 118 travels down the index finger 102 and then branches out across the palm of the hand 110 to be detected by each of the sensors 602, 604. In the illustrated example, the vibration 608 may result from the same hand movement and/or gesture that generates the first vibration 130 represented in FIG. 1. As such, the particular vibration pattern of the vibration 608 of FIG. 6 may be the same as or similar to the first vibration of 130 of FIG. 1. That is, as mentioned above, the different points of termination of the travel path of the vibration 608 represented in FIG. 6 relative to termination point of the travel path of the first vibration 130 represented in FIG. 1 is the result of the different location of the sensors 602, 604 in FIG. 6 relative to the location of the sensor 112 in FIG. 1. Of course, there may be some difference in the vibration pattern detected by the sensors 602, 604 in FIG. 6 relative the sensor 112 in FIG. 1 arising from the apparatus 100, 600 worn at different locations on the user as well as the different parts of the hand 110 through which the vibrations 130, 608 travel before being detected by the corresponding sensor(s) 112, 602, 604.

As can be seen from the illustrated example of FIG. 6, the distance traveled by the first vibration 130 to the first sensor 602 is shorter than the distance to the second sensor 604. As a result, the point in time at which each of the sensors 602, 604 detect the first vibration 130 will be slightly different, with the first sensor 602 detecting the first vibration 130 a period of time before the second sensor 604. In some examples, the time difference between the detection of the first vibration 130 by each of the sensors 602, 604 is used to uniquely identify when the first virtual button 118 is selected (e.g., tapped by the button selector 128). This is possible because the time difference between the detection of the first vibration 130 by each of the sensors 602, 604 will be different than the time difference between the sensors 602, 604 detecting any of the other vibrations 132, 134, 136 (represented in FIG. 1) corresponding to the selection of each of the other virtual buttons 120, 122, 124.

More generally, the time difference between the sensors 602, 604 detecting a particular vibration (similar to the time difference of arrival (TDOA) used in multilateration) can be expressed as T1−T2, where T1 is the time it takes for the vibration to travel to the first sensor 602 and T2 is the time it takes for the vibration to travel to the second sensor 604. Thus, in the illustrated examples, a positive value for the time difference indicates that a detected vibration originated at a virtual button closer to the second sensor 604 than the first sensor 602, whereas a negative value for the time difference indicates that the detected vibration originated at a virtual button closer to the first sensor 602 than the second sensor 604. Where the value of the time difference for vibrations from two different virtual buttons 118, 120, 122, 124 have the same sign (both positive or both negative), the size of the absolute value of the time difference is used to distinguish the virtual button selected with a larger absolute value indicating closer proximity to the nearest of the two sensors 602, 604.

For example, as represented in FIG. 6, T1 for the first vibration 130 is much smaller (based on a shorter travel distance for the vibration) than T2 resulting in a negative time difference. A vibration originating from the second virtual button 120 (e.g., the second vibration 132 of FIG. 1) will also result in a negative time difference because the second virtual button 120 is closer to the first sensor 602 than the second sensor 604. However, the absolute value of the time difference will be less than for the first vibration 130 because T1 associated with the second virtual button 120 is slightly longer than T1 associated with the first virtual button 118 and T2 associated with the second virtual button 120 is slightly shorter than T2 associated with the first virtual button 118. By contrast, selecting (e.g., tapping) the third or fourth virtual buttons 122, 124 will result in a positive time difference between the sensors 602, 604 detecting an associated vibration because the third and fourth virtual buttons 122, 124 are closer to the second sensor 604 than the first sensor 602. Further, vibrations originating from the third virtual button 122 are distinguishable from vibrations originating from the fourth virtual button 124 because the absolute value of the time difference detected between the sensors for the third virtual button will be less than for the fourth virtual button. This is because the fourth virtual button 124 is the farthest from the first sensor 602 and the closest to the second sensor 604 resulting in the largest T1 and the smallest T2.

Figure 7:
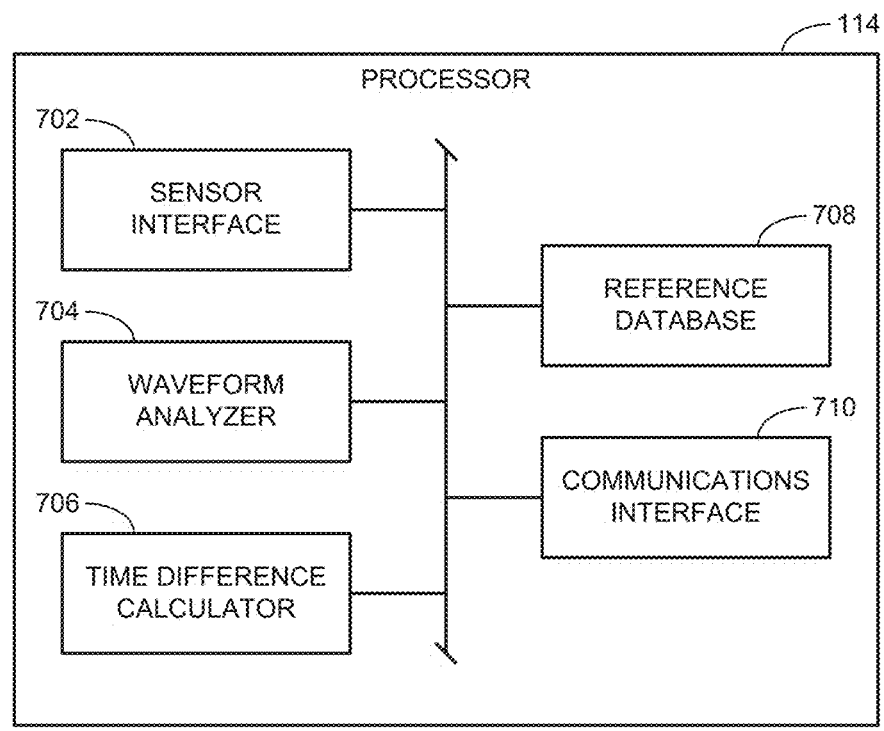
FIG. 7 is a block diagram illustrating an example implementation of the processor in the example wearable apparatus of FIGS. 1 and/or 6.

Thus, in the illustrated examples of FIGS. 6 and 7, the time difference between the detection by the sensors 602, 604 of a vibration origination from the fourth virtual button 124 is greater than for a vibration origination from the third virtual button 122, which is greater than for a vibration origination from the second virtual button 120, which is greater than for a vibration origination from the first virtual button 118. More particularly, each virtual button 118, 120, 122, 124 will be associated with a particular value (or narrow range of values) for a time difference between the sensors 602, 604 detecting a vibration originating therefrom. The particular value of the time difference associated with each virtual button 118, 120, 122, 124 may be different from one user to another based on the size of each user's hand and the way each user selects (e.g. taps) each virtual button. However, the values for any particular user may be determined during an initial calibration of the apparatus 600 and stored for subsequent use. Based on these stored values, selection of any one of the virtual buttons 118, 120, 122, 124 can be uniquely identified by matching an observed time difference to a stored reference time difference value associated with a particular virtual button. Thus, this identification is accomplished without the need to analyze the waveform of each vibration for pattern matching as discussed above in connection with FIGS. 1-5. As such, the example apparatus 600 of FIG. 6 may be able to detect and identify button selections much faster than using the technique described above in connection with FIG. 1. Of course, in some examples, waveform analysis may be used in conjunction with the time difference determination to increase the accuracy of the vibration inducing hand movement identification.

While the example apparatus 600 of FIG. 6 includes two sensors, more than two sensors may alternatively be used to further enhance the identification of the source of detected vibrations using multilateration techniques. Additionally or alternatively, the sensors 602, 604 (and any other sensors that may be implemented) may be placed at different locations on the hand 110 other than as shown in FIG. 6. For example, the sensors 602, 604 may be placed on opposite sides near the base of the palm further away from the fingers 102, 104, 106, 108, on the wrist, in a central region of the palm, on the back of the hand 110, and/or at any other suitable locations that will be able to detect vibrations in the hand 110 and produce a time difference in such detection between the two or more sensors. Furthermore, although the sensors 602, 604 are shown held against the hand 110 using the band 606, the sensors 602, 604 may be maintained in position using other methods such as, for example, a removable adhesive, or incorporating the sensors 602, 604 into a glove that fits over the hand 110.

Furthermore, in some examples, rather than identifying the particular virtual button 118, 120, 122, 124 that is the source of origin of a particular vibration based on a difference in time of arrival of the detected vibration signal, the source of vibration (e.g., virtual button 118, 120, 122, 124) may be identified based on a phase difference between the vibration as detected by each of the sensors 602, 604. In some examples, a phase different between the vibrations detected from each virtual button 118, 120, 122, 124 will be different for each different virtual button 118, 120, 122, 124. Thus, in this manner, a user selection of any one of the virtual button 118, 120, 122, 124 may be uniquely identified.

While the example apparatus 100, 600 of FIGS. 1 and 6 have been described in the context of virtual buttons 118, 120, 122, 124 on the tips of each of the four fingers 102, 104, 106, 108 being selected by a tap from a button selector 128 on the tip of the thumb 126, the same principles may be applied to detect other hand movements corresponding to other virtual user input buttons (in addition to or instead of the virtual buttons 118, 120, 122, 124 described above) so long as they produce detectable vibrations that are distinguishable from other vibration inducing hand movements and/or gestures. For example, more than one of the fingers 102, 104, 106, 108 may be tapped against the thumb 126 at a time. As another example, the thumb 126 may tap the tip of a finger for one button and a different region of the same finger (e.g., at the intermediate phalange) for a second button. In other examples, users may snap or clap their fingers against the palm of their hand to produce different vibrations corresponding to different virtual buttons.

Furthermore, the fingers 102, 104, 106, 108 need not necessarily be tapped against the thumb 126 or other region of the hand 110. In some examples, the fingers 102, 104, 106, 108 may be tapped against a table top or other surface to generate vibrations in the hand 110. In such examples, the tip of the thumb 126 could be used as a separate virtual button tapped against the surface rather than functioning as the button selector 128 as described above. Furthermore, in some examples, particular regions of the hand 110 (including the fingers 102, 104, 106, 108, the thumb 126, the palm, etc.) may be tapped or struck by the user's other hand and/or with a separate object to generate vibrations in the hand 110 associated with the wearable apparatus 600.

FIG. 7 is a block diagram illustrating an example implementation of the processor 114 in the example apparatus 100, 600 of FIGS. 1 and 6. In the illustrated example, the processor 114 includes an example sensor interface 702, an example waveform analyzer 704, an example time difference calculator 706, an example reference database 708, and an example communications interface 710.

The example processor 114 is provided with the example sensor interface 702 to receive vibration signals detected by one or more of the sensors 112, 602, 604. The example processor 114 is provided with the example waveform analyzer 704 to analyze the vibration signals detected by the sensors 112, 602, 604. In some examples, the waveform analyzer 704 detects a pattern in the vibration signal and compares it to reference vibration signals stored in the reference database 708 to identify the virtual button associated with the detected vibration signal waveform. In some examples, the reference vibration signals correspond to particular hand movements and/or gestures associated with each virtual button that are stored during a one-time calibration of the apparatus 100, 600.

The example processor 114 is provided with the example time difference calculator 706 to calculate a time difference between two or more sensors (e.g., the sensors 602, 604 of FIG. 6) detecting a particular vibration in the hand 110. In some examples, the time difference calculator 706 compares calculated values of a time difference with reference time difference values stored in the reference database 708 to identify the virtual button associated with the detected time difference. In some examples, the reference time difference values correspond to particular hand movements and/or gestures associated with virtual buttons that are stored during a one-time calibration of the apparatus 100, 600.

The example processor 114 is provided with the example communications interface 710 to communicate with the electronic device 111. In particular, the communications interface 710 may transmit the identification of a selection of a virtual button as determined by at least one of the waveform analyzer 704 or the time difference calculator 706. In this manner, the electronic device 111 can implement any suitable functionality associated with the selection of the identified virtual button.

While an example manner of implementing the processor 114 of FIGS. 1 and/or 6 is illustrated in FIG. 7, one or more of the elements, processes and/or devices illustrated in FIG. 7 may be combined, divided, re-arranged, omitted, eliminated and/or implemented in any other way. Further, the example sensor interface 702, the example waveform analyzer 704, the example time difference calculator 706, the example reference database 708, the example communications interface 710, and/or, more generally, the example processor 114 of FIGS. 1 and/or 6 may be implemented by hardware, software, firmware and/or any combination of hardware, software and/or firmware. Thus, for example, any of the example sensor interface 702, the example waveform analyzer 704, the example time difference calculator 706, the example reference database 708, the example communications interface 710, and/or, more generally, the example processor 114 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 702, the example waveform analyzer 704, the example time difference calculator 706, the example reference database 708, and/or the example communications interface 710 is/are hereby expressly defined to include a tangible computer readable storage device or storage disk such as a memory, a digital versatile disk (DVD), a compact disk (CD), a Blu-ray disk, etc. storing the software and/or firmware. Further still, the example processor 114 of FIGS. 1 and/or 6 may include one or more elements, processes and/or devices in addition to, or instead of, those illustrated in FIG. 7, and/or may include more than one of any or all of the illustrated elements, processes and devices.

Figure 8:
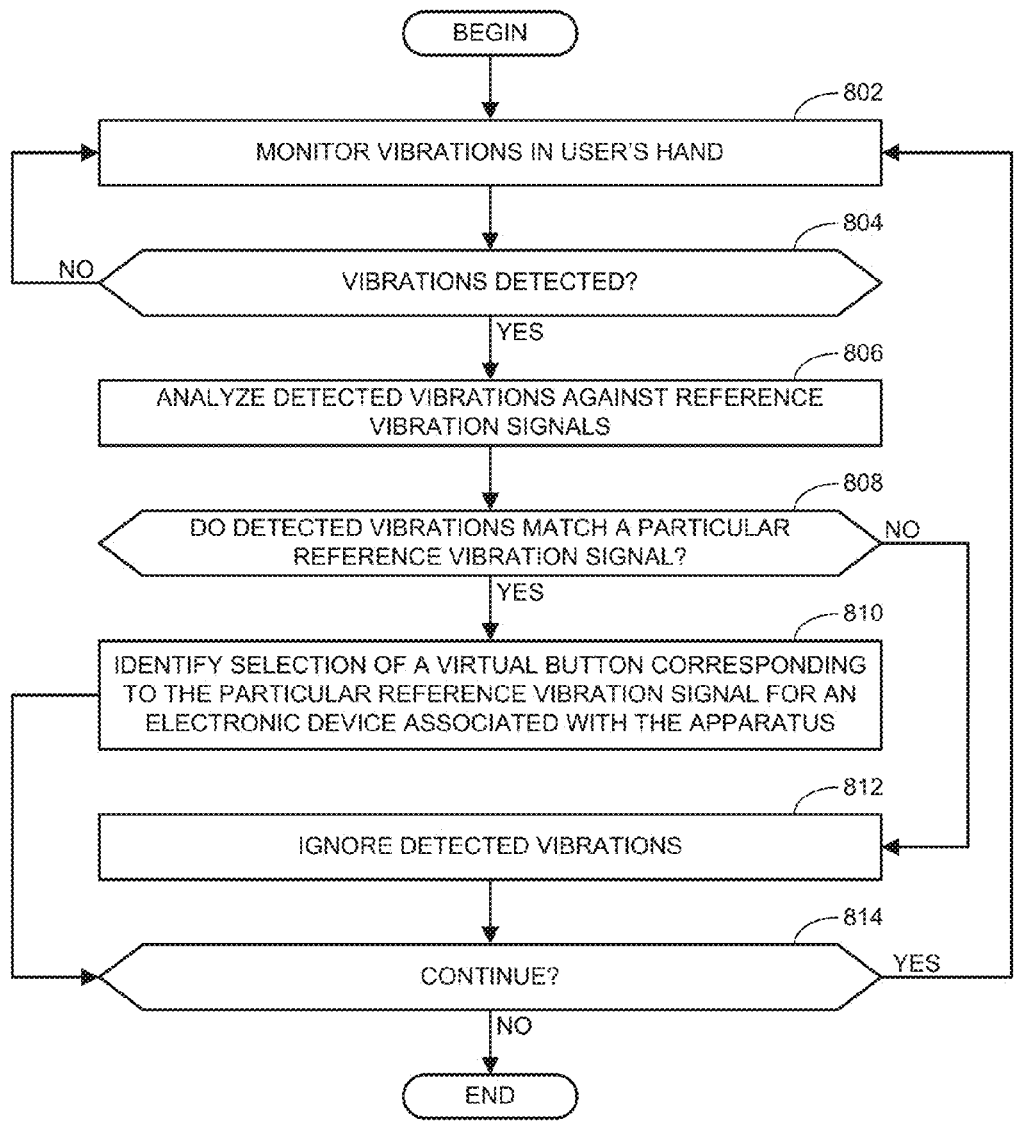
FIG. 8 is a flowchart representative of example machine-readable instructions that may be executed to implement the example processor of FIG. 7 implemented in connection with the example wearable apparatus of FIG. 1.
Figure 9:
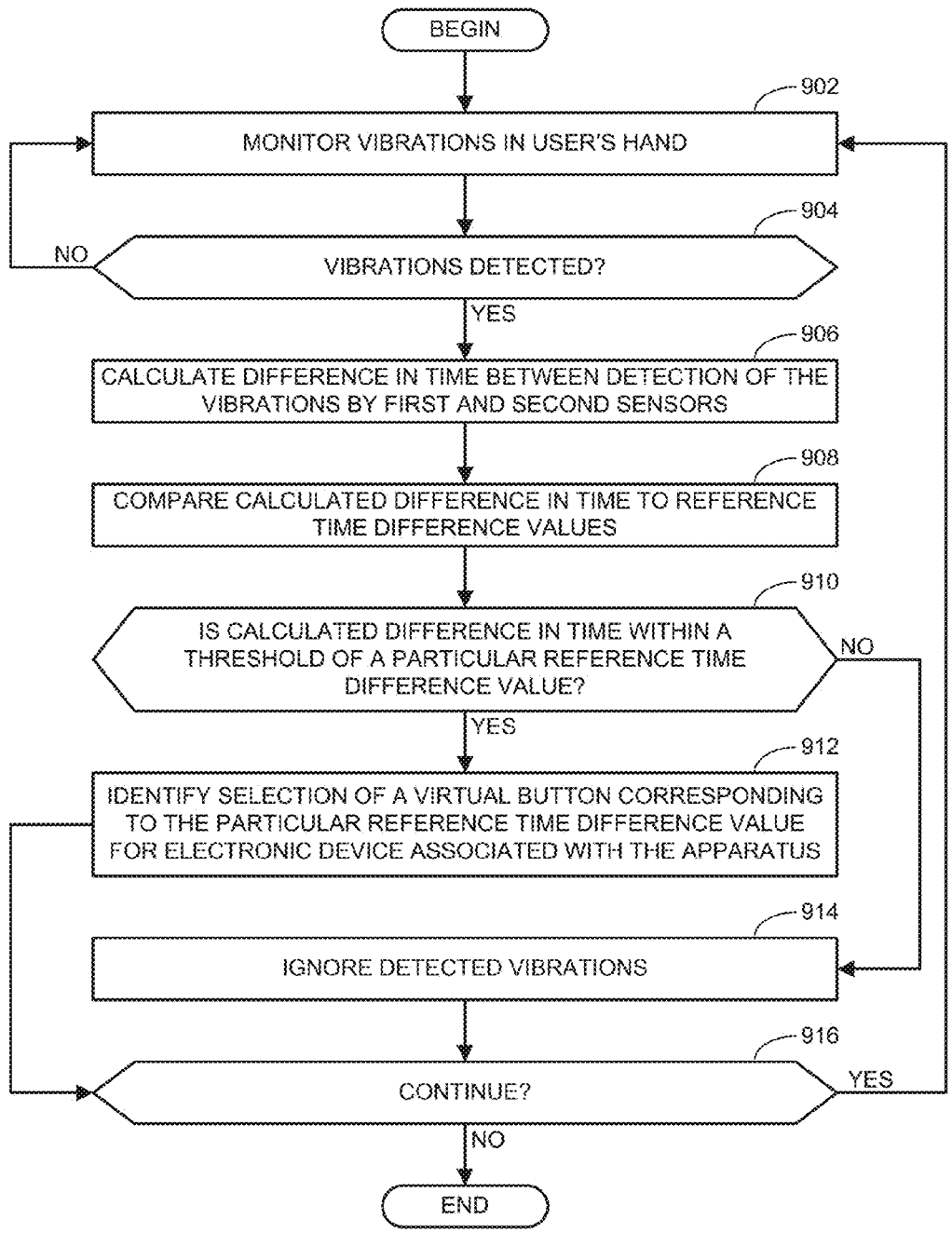
FIG. 9 is a flowchart representative of example machine-readable instructions that may be executed to implement the example processor of FIG. 7 implemented in connection with the example wearable apparatus of FIG. 6.

Flowcharts representative of example machine readable instructions for implementing the wearable apparatus 100, 600 of FIGS. 1 and/or 6 are shown in FIGS. 8 and 9. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 8 and 9, many other methods of implementing the example wearable apparatus 100, 600 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8 and 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to the figures, FIG. 8 is a flowchart representative of example machine-readable instructions that may be executed to implement the example processor 114 of FIG. 7 implemented in connection with the example wearable apparatus 100 of FIG. 1. The example program of FIG. 8 begins at block 802 where the sensor 112 monitors vibrations in a user's hand (e.g., the hand 110). At block 804, the example processor 114 determines whether vibrations have been detected. If not, control returns to block 802. If vibrations have been detected (e.g., the sensor interface 702 receives detected vibrations signals from the sensor 112), control advances to block 806.

At block 806, the example waveform analyzer 704 analyzes the detected vibrations against reference vibration signals. As described above, the waveform analyzer 704 may use any suitable pattern detection technique or apply a cross correlation to identify the pattern associated with the detected vibrations. At block 808, the example waveform analyzer 704 determines whether the detected vibrations match a particular reference vibration signal. In some examples, a perfect match is not required. Rather, the match meets a specific threshold level of certainty to be considered a match. In some examples, the waveform analyzer 704 may use a fast Fourier transform before matching patterns to improve the accuracy of the identification. If the example waveform analyzer 704 determines that the detected vibrations do match a particular reference vibration signal, control advances to block 810.

At block 810, the example communications interface 710 identifies the selection of a virtual button corresponding to the particular reference vibration signal for an electronic device associated with the apparatus 100. Control then advances to block 814 where the example processor 114 determines whether to continue the process. If so, control returns to block 802. Otherwise, the example process of FIG. 8 ends.

Returning to block 808, if the example waveform analyzer 704 determines that the detected vibrations do not match a particular reference vibration signal, control advances to block 812. The example waveform analyzer 704 failing to identify the detected vibrations may indicate that the vibrations are unrelated to the selection of a particular virtual button. Accordingly, at block 812, the example processor 114 ignores the detected vibrations. Thereafter, control advances to block 814 to either return to block 802 or end the process of FIG. 8.

FIG. 9 is a flowchart representative of example machine-readable instructions that may be executed to implement the example processor 114 of FIG. 7 implemented in connection with the example wearable apparatus 600 of FIG. 6. The example process begins at block 902 where the sensors 602, 604 monitor vibrations in a user's hand 110. In the example process of FIG. 9, at least two sensors are used. At block 904, the example processor 114 determines whether vibrations have been detected. If not, control returns to block 902. If vibrations have been detected (e.g., the sensor interface 702 receives detected vibrations signals from each of the first and second sensors 602, 604 of FIG. 6), control advances to block 906.

At block 906, the example time difference calculator 706 calculates the difference in time between the detection of the vibrations by the first and second sensors 602, 604. In some examples, the time difference calculator 706 may calculate the time difference between more than two sensors. At block 908, the example time difference calculator 706 compares the calculated difference in time to reference time difference values. At block 910, the example time difference calculator 706 determines whether the calculated difference in time is within a threshold of a particular reference time difference value. In some examples, the threshold serves to account for slight variation in the detected time differences between multiple selections of the same virtual button. If the example time difference calculator 706 determines that the calculated difference in time is within the threshold of a particular reference time difference value, control advances to block 912.

At block 912, the example communications interface 710 identifies the selection of a virtual button corresponding to the particular reference time difference value for an electronic device associated with the apparatus 100. Control then advances to block 916 where the example processor 114 determines whether to continue the process. If so, control returns to block 902. Otherwise, the example process of FIG. 9 ends.

Returning to block 910, if the example time difference calculator 706 determines that the calculated difference in time is not within a threshold of a particular reference time difference value, control advances to block 914. The calculated difference in time falling outside the threshold may indicate that the detected vibrations are unrelated to the selection of a particular virtual button. Accordingly, at block 914, the example processor 114 ignores the detected vibrations. Thereafter, control advances to block 916 to either return to block 902 or end the process of FIG. 9.

Figure 10:
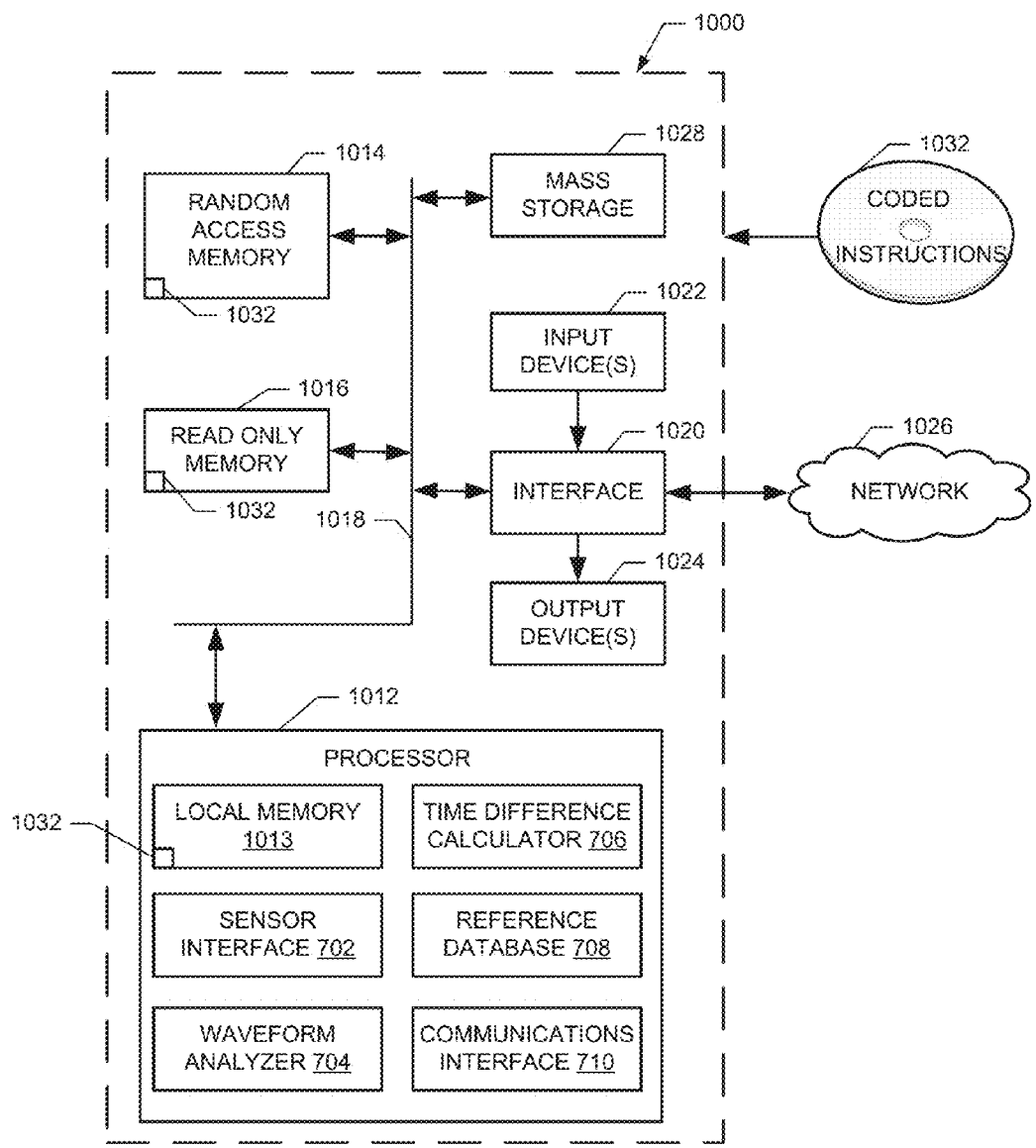
FIG. 10 is a block diagram of an example processor platform capable of executing the example machine-readable instructions of FIGS. 8 and/or 9 to implement the example wearable apparatus of FIGS. 1 and/or 6.

FIG. 10 is a block diagram of an example processor platform 1000 capable of executing the instructions of FIGS. 8 and/or 9 to implement the wearable apparatus 100, 600 of FIGS. 1 and/or 6. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 may correspond to the processor 114 to execute one or more of the example sensor interface 702, the example waveform analyzer 704, the example time difference calculator 706, the example reference database 708, the example communications interface 710 of FIG. 7. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 8 and 9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture enable a user wearing any of the apparatus disclosed herein to select inputs for an electronic device merely by the use of the user's hand. As such, there is no need to take up space on the electronic device for physical buttons or other human-machine interface input mechanisms. In this manner, the electronic device can be made smaller and/or the saved space may be used to improve the processing power, battery life, and/or other functionalities of the device. Additionally, in some examples, vibration inducing hand movements and/or gestures are detected without any portion of the wearable apparatus directly contacting the user's hand such that the hand remains free to move without physical constraint.

Example 1 is an apparatus to detect vibration inducing hand gestures that includes a sensor to detect a vibration in a hand of a user wearing the apparatus; and a processor to analyze the vibration to identify a user selection of a virtual control associated with an input to an electronic device.

Example 2 includes the subject matter of Example 1, wherein the vibration results from a finger being tapped against a thumb of the user.

Example 3 includes the subject matter of Example 2, wherein the sensor is to detect the vibration without the apparatus contacting any part of the finger.

Example 4 includes the subject matter of anyone of Examples 1-3, wherein the sensor is a piezoelectric sensor.

Example 5 includes the subject matter of anyone of Examples 1-3, wherein the sensor is a microphone.

Example 6 includes the subject matter of anyone of Examples 1-5, wherein the sensor is held against at least one of a wrist or a forearm of the user.

Example 7 includes the subject matter of anyone of Examples 1-6, wherein the sensor is held against the user using a band.

Example 8 includes the subject matter of anyone of Examples 1-6, wherein the sensor is held against the user using a removable adhesive.

Example 9 includes the subject matter of anyone of Examples 1-8, wherein the sensor is to detect the vibration without the apparatus directly contacting any part of the hand of the user.

Example 10 includes the subject matter of anyone of Examples 1-9, wherein the vibration is generated by a movement of the hand.

Example 11 includes the subject matter of Example 10, wherein the processor is to compare a waveform of the vibration to a reference vibration signal. The processor is to identify the movement based on the comparison.

Example 12 includes the subject matter of Example 11, wherein the movement is a first movement and the vibration is a first vibration corresponding to the first movement. The sensor is to detect a second vibration in the hand corresponding to a second movement. A waveform of the second movement is distinguishable from the waveform of the first vibration.

Example 13 includes the subject matter of anyone of Examples 1-12, wherein the sensor is a first sensor, the apparatus further including a second sensor. The first and second sensors to be held against the hand of the user. The first sensor to be spaced apart from the second sensor.

Example 14 includes the subject matter of Example 13, wherein the first sensor is proximate to an index finger of the hand and the second sensor is proximate to a little finger of the hand.

Example 15 includes the subject matter of anyone of Examples 13 or 14, wherein the first sensor is proximate to a first edge of the hand and the second sensor is proximate to a second edge of the hand opposite the first edge.

Example 16 includes the subject matter of anyone of Examples 13-15, wherein the first and second sensors are positioned proximate a base of fingers of the hand.

Example 17 includes the subject matter of anyone of Examples 13-16, wherein the processor is to identify the user selection of the virtual control based on a time difference between the detection of the vibration by each of the first sensor and the second sensor.

Example 18 includes the subject matter of Example 17, wherein the vibration is a first vibration corresponding to a first movement of the hand. The sensor is to detect a second vibration in the hand corresponding to a second movement of the hand. A time difference between the detection of the second vibration by each of the first sensor and the second sensor being distinguishable from the time difference between the detection of the first vibration by each of the first sensor and the second sensor.

Example 19 includes the subject matter of anyone of Examples 13-16, wherein the processor is to identify the user selection of the virtual control based on a phase difference between the vibration as detected by the first sensor and the vibration as detected by the second sensor.

Example 20 includes the subject matter of anyone of Examples 1-19, wherein the vibration is indicative of an identity of the user.

Example 21 is an apparatus to detect vibration inducing hand gestures that includes a sensor to detect a vibration in a hand of a user generated by a movement of the hand. The movement corresponds to a user selection of a virtual control used as an input for an electronic device. Feedback from the sensor is to be used to identify the input for the electronic device. The apparatus of Example 21 further includes means for attaching the sensor to the user to enable the detection of the vibration.

Example 22 includes the subject matter of Example 21, wherein the movement is a finger being tapped against a thumb of the user.

Example 23 includes the subject matter of anyone of Examples 21 or 22, wherein the virtual control is a virtual button associated with a tip of a finger of the user.

Example 24 includes the subject matter of anyone of Examples 21-23, wherein the sensor is at least one of a piezoelectric sensor or a microphone.

Example 25 includes the subject matter of anyone of Examples 21-24, wherein the means for attaching the sensor to the user is to hold the sensor against at least one of a wrist or a forearm of the user.

Example 26 includes the subject matter of anyone of Examples 21-25, wherein the means for attaching the sensor to the user is at least one of a band or removable adhesive.

Example 27 includes the subject matter of anyone of Examples 21-26, wherein the sensor is to detect the vibration without the apparatus directly contacting any part of the hand of the user.

Example 28 includes the subject matter of anyone of Examples 21-27, wherein the feedback includes a waveform of the vibration. The waveform is to be compared to a reference vibration signal to identify the input for the electronic device.

Example 29 includes the subject matter of Example 28, wherein the movement is a first movement and the vibration is a first vibration corresponding to the first movement. The sensor is to detect a second vibration in the hand generated by a second movement of the hand. The second movement corresponds to a user selection of a second virtual control used as a second input for the electronic device. The first movement is distinguishable from the second movement based on a difference in the feedback from the sensor detecting each of the first and second movements.

Example 30 includes the subject matter of anyone of Examples 21-28, wherein the sensor is a first sensor. The apparatus of Example 30 further includes a second sensor. The first sensor is to be spaced apart from the second sensor.

Example 31 includes the subject matter of Example 30, wherein the first sensor is held proximate a first edge of the hand adjacent an index finger of the hand and the second sensor is held proximate a second edge of the hand adjacent a little finger of the hand.

Example 32 includes the subject matter of anyone of Examples 30 or 31, wherein the first and second sensors are positioned proximate a base of fingers of the hand.

Example 33 includes the subject matter of anyone of Examples 30-32, wherein the first and second sensors are spaced apart such that the first sensor detects the vibration a period of time before the second sensor detects the vibration. The user selection of the input for the electronic device is to be identified based on the period of time.

Example 34 includes the subject matter of anyone of Examples 30 or 31, wherein the processor is to identify the user selection of the virtual control based on a phase difference between the vibration as detected by the first sensor and the vibration as detected by the second sensor.

Example 35 includes the subject matter of anyone of Examples 21-34, wherein the means for attaching the sensor to the user is spaced apart from the hand to enable free movement of the hand without physical constraint.

Example 36 is a method that includes receiving, at a processor, a signal from a sensor detecting a vibration inducing movement of a hand of a user. The movement corresponds to a user selection of an input for an electronic device. The method of Example 36 further includes analyzing, with the processor, the signal to identify the user selection of the input for the electronic device.

Example 37 includes the subject matter of Example 36, wherein the movement is a finger being tapped against a thumb of the user.

Example 38 includes the subject matter of anyone of Examples 36 or 37, wherein the sensor is a piezoelectric sensor.

Example 39 includes the subject matter of anyone of Examples 36 or 37, wherein the sensor is a microphone.

Example 40 includes the subject matter of anyone of Examples 36-39, wherein the sensor is held against at least one of a wrist or a forearm of the user.

Example 41 includes the subject matter of anyone of Examples 36-40, wherein the sensor is held against the user using a band.

Example 42 includes the subject matter of anyone of Examples 36-41, wherein the sensor is held against the user using a removable adhesive.

Example 43 includes the subject matter of Examples 36-42, wherein the sensor is to detect the vibration inducing movement of the hand without directly contacting any part of the hand.

Example 44 includes the subject matter of anyone of Examples 36-43, where the method further includes comparing a waveform associated with the signal to a reference vibration signal; and identifying the user selection of the input for the electronic device based on the comparison.

Example 45 includes the subject matter of anyone of Examples 36-44, wherein the sensor is a first sensor and the signal is a first signal, the method further including receiving a second signal from a second sensor detecting the vibration inducing hand movement.

Example 46 includes the subject matter of Example 45, wherein the first sensor is proximate to an index finger of the hand and the second sensor is proximate to a little finger of the hand.

Example 47 includes the subject matter of anyone of Examples 45 or 46, wherein the first sensor is proximate to a first edge of the hand and the second sensor is proximate to a second edge of the hand opposite the first edge.

Example 48 includes the subject matter of anyone of Examples 45-47, wherein the first and second sensors are positioned proximate a base of fingers of the hand.

Example 49 includes the subject matter of anyone of Examples 45-48, wherein the vibration inducing movement generates a first vibration originating at a first location on the hand of the user. The first and second sensors are to be spaced apart such that a first duration of the first vibration to travel from the first location to the first sensor is different than a second duration of the first vibration to travel from the first location to the second sensor.

Example 50 includes the subject matter of Example 49, wherein a second vibration inducing movement generates a second vibration originating at a second location on the hand of the user. The first duration of the first vibration subtracted from the second duration of the first vibration defines a first time difference. A first duration of the second vibration to travel from the second location to the first sensor subtracted from a second duration of the second vibration to travel from the second location to the second sensor defining a second time difference, the first time difference being different than the second time difference.

Example 51 includes the subject matter of anyone of Examples 45-48, wherein the vibration inducing movement generates a vibration signal originating at a location on the hand of the user. The method further includes identifying the location based on a phase difference between the vibration signal as detected by the first sensor and the vibration as detected by the second sensor Example 52 is a tangible computer readable storage medium, comprising instructions that, when executed, cause a machine to at least receive a signal from a sensor detecting a vibration inducing movement of a hand of a user. The movement corresponds to a user selection of an input for an electronic device. The instructions further cause the machine to analyze the signal to identify the user selection of the input for the electronic device.

Example 53 includes the subject matter of Example 52, wherein the movement is a finger being tapped against a thumb of the user.

Example 54 includes the subject matter of anyone of Examples 52 or 53, wherein the sensor is a piezoelectric sensor.

Example 55 includes the subject matter of anyone of Examples 52 or 53, wherein the sensor is a microphone.

Example 56 includes the subject matter of anyone of Examples 52-55, wherein the sensor is held against at least one of a wrist or a forearm of the user.

Example 57 includes the subject matter of anyone of Examples 52-56, wherein the sensor is held against the user using a band.

Example 58 includes the subject matter of anyone of Examples 52-57, wherein the sensor is held against the user using a removable adhesive.

Example 59 includes the subject matter of anyone of Examples 52-58, wherein the sensor is to detect the vibration inducing movement of the hand without directly contacting any part of the hand.

Example 60 includes the subject matter of anyone of Examples 52-59, wherein the instructions, when executed, further cause the machine to compare a waveform associated with the signal to a reference vibration signal. The instructions also cause the machine to identify the user selection of the input for the electronic device based on the comparison.

Example 61 includes the subject matter of anyone of Examples 52-60, wherein the sensor is a first sensor and the signal is a first signal, the instructions further causing the machine to receive a second signal from a second sensor detecting the vibration inducing hand movement.

Example 62 includes the subject matter of Example 61, wherein the first sensor is proximate to an index finger of the hand and the second sensor is proximate to a little finger of the hand.

Example 63 includes the subject matter of anyone of Examples 61 or 62, wherein the first sensor is proximate to a first edge of the hand and the second sensor is proximate to a second edge of the hand opposite the first edge.

Example 64 includes the subject matter of anyone of Examples 61-63, wherein the first and second sensors are positioned proximate a base of fingers of the hand.

Example 65 includes the subject matter of anyone of Examples 61-64, wherein the vibration inducing movement generates a first vibration originating at a first location on the hand of the user, the first and second sensors to be spaced apart such that a first duration of the first vibration to travel from the first location to the first sensor is different than a second duration of the first vibration to travel from the first location to the second sensor.

Example 66 includes the subject matter of Example 65, wherein a second vibration inducing movement generates a second vibration originating at a second location on the hand of the user. The first duration of the first vibration subtracted from the second duration of the first vibration defines a first time difference. A first duration of the second vibration is to travel from the second location to the first sensor subtracted from a second duration of the second vibration to travel from the second location to the second sensor defining a second time difference. The first time difference is different than the second time difference.

Example 67 includes the subject matter of anyone of Examples 61-64, wherein the instructions, when executed, further cause the machine to identify a location of origin of a vibration signal generated by the vibration inducing movement based on a phase difference between the vibration signal as detected by the first sensor and the vibration signal as detected by the second sensor.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect vibration inducing hand gestures, the apparatus comprising:
    a first sensor to detect a vibration in a hand of a user wearing the apparatus, the vibration associated with a point of origin on the hand of the user;
    a second sensor to detect the vibration in the hand of the user, the first and second sensors spaced apart such that a first duration for the vibration to travel from the point of origin to the first sensor is different than a second duration for the vibration to travel from the point of origin to the second sensor; and
    a processor to analyze at least one of outputs of the first and second sensors to identify a user selection of a virtual control associated with an input to an electronic device.

2. The apparatus as defined in claim 1, wherein the vibration results from a finger being tapped against a thumb of the user.

3. The apparatus as defined in claim 1, wherein at least one of the first sensor or the second sensor is held against at least one of a wrist or a forearm of the user.

4. The apparatus as defined in claim 3, wherein the at least one of the first sensor or the second sensor is held by a band.

5. The apparatus as defined in claim 3, wherein the at least one of the first sensor or the second sensor is held by a removable adhesive.

6. The apparatus as defined in claim 1, wherein at least one of the first sensor or the second sensor is to detect the vibration without the apparatus directly contacting any part of the hand of the user.

7. The apparatus as defined in claim 1, wherein the vibration is generated by a movement of the hand.

8. The apparatus as defined in claim 7, wherein the processor is to compare a waveform of the vibration to a reference vibration signal, the processor to identify the movement based on the comparison.

9. The apparatus as defined in claim 8, wherein the movement is a first movement and the vibration is a first vibration corresponding to the first movement, at least one of the first sensor or the second sensor to detect a second vibration in the hand corresponding to a second movement, a waveform of the second movement being distinguishable from the waveform of the first vibration.

10. The apparatus as defined in claim 1, wherein the first and second sensors are held against the hand of the user.

11. The apparatus as defined in claim 10, wherein the first sensor is proximate to an index finger of the hand and the second sensor is proximate to a little finger of the hand.

12. The apparatus as defined in claim 10, wherein the processor is to identify the user selection of the virtual control based on a difference between a first time of the detection of the vibration by the first sensor and a second time of the detection of the vibration by the second sensor.

13. The apparatus as defined in claim 10, wherein the processor is to identify the user selection of the virtual control based on a difference between a first phase of the vibration as detected by the first sensor and a second phase of the vibration as detected by the second sensor.

14. The apparatus as defined in claim 1, wherein the vibration is indicative of an identity of the user.

15. A method, comprising:
    accessing, with at a processor, a first signal from a first sensor in response to a vibration inducing movement of a hand of a user, the movement corresponding to a user selection of an input for an electronic device;
    accessing, with the processor, a second signal from a second sensor detecting the vibration inducing movement, the vibration inducing movement to generate a first vibration at a first location on the hand of the user, the first and second sensors spaced apart such that a first time of travel of the first vibration from the first location to the first sensor is different than a second time of travel of the first vibration from the first location to the second sensor; and
    analyzing, by executing an instruction with the processor, the first and second signals to identify the user selection of the input for the electronic device.

16. The method as defined in claim 15, further including:
comparing a waveform associated with at least one of the first signal or the second signal to a reference vibration signal; and
identifying the user selection of the input for the electronic device based on the comparison.

17. The method as defined in claim 15, wherein the first sensor is proximate to a first edge of the hand and the second sensor is proximate to a second edge of the hand opposite the first edge.

18. The method as defined in claim 15, wherein a second vibration inducing movement is to generate a second vibration originating at a second location on the hand of the user, the first time of travel of the first vibration subtracted from the second time of travel of the first vibration defining a first time difference, a third time of travel of the second vibration from the second location to the first sensor subtracted from a fourth time of travel of the second vibration from the second location to the second sensor defining a second time difference, the first time difference being different than the second time difference.

19. A non-transitory computer readable medium, comprising instructions that, when executed, cause a machine to at least:
obtain a first signal from a first sensor based on a vibration inducing movement of a hand of a user, the movement corresponding to a user selection of an input for an electronic device;
obtain a second signal from a second sensor based on the vibration inducing movement, the vibration inducing movement to generate a first vibration originating at a first location on the hand of the user, the first and second sensors to be spaced apart such that a first time for the first vibration to travel from the first location to the first sensor is different than a second time for the first vibration to travel from the first location to the second sensor; and
analyze the first and second signals to identify the user selection of the input for the electronic device.

20. The non-transitory computer readable medium as defined in claim 19, wherein the instructions, when executed, further cause the machine to:
compare a waveform associated with at least one of the first signal or the second signal to a reference vibration signal; and
identify the user selection of the input for the electronic device based on the comparison.

21. The non-transitory computer readable medium as defined in claim 19, wherein the first and second sensors are positioned proximate a base of fingers of the hand.

22. The apparatus as defined in claim 1, wherein the first sensor is secured against the hand between a base of an index finger of the hand and a base of a thumb of the hand.

23. The apparatus as defined in claim 1, wherein the second sensor is secured against the hand between a base of a little finger of the hand and a wrist of the user.

24. The apparatus as defined in claim 8, further including a reference database to store the reference vibration signal, the reference vibration signal stored in the reference database before the first and second sensors detect the vibration in the hand of the user.

25. The apparatus as defined in claim 12, wherein the vibration is a first vibration corresponding to a first movement of the hand, the first and second sensors to detect a second vibration in the hand corresponding to a second movement of the hand, the difference between the first time of the detection of the first vibration by the first sensor and the second time of the detection of the first vibration by the second sensor is distinguishable from a difference between a third time of the detection of the second vibration by the first sensor and a fourth time of the detection of the vibration by the second sensor.

* * * * *